No. 668,174. Patented Feb. 19, 1901.
J. D. FORRER.
TROLLEY WHEEL AND HARP.
(Application filed June 8, 1900.)
(No Model.) 2 Sheets—Sheet 1.

WITNESSES:
G. M. Powell.
B. M. Smith

INVENTOR
J. D. Forrer,
BY Geo. H. Parmelee,
his ATTORNEY.

THE NORRIS PETERS CO., PHOTO-LITHO., WASHINGTON, D. C.

No. 668,174. Patented Feb. 19, 1901.
J. D. FORRER.
TROLLEY WHEEL AND HARP.
(Application filed June 8, 1900.)
(No Model.) 2 Sheets—Sheet 2.
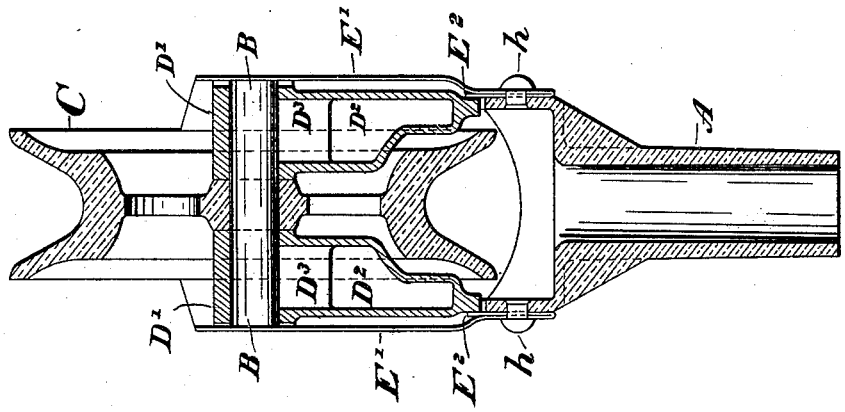
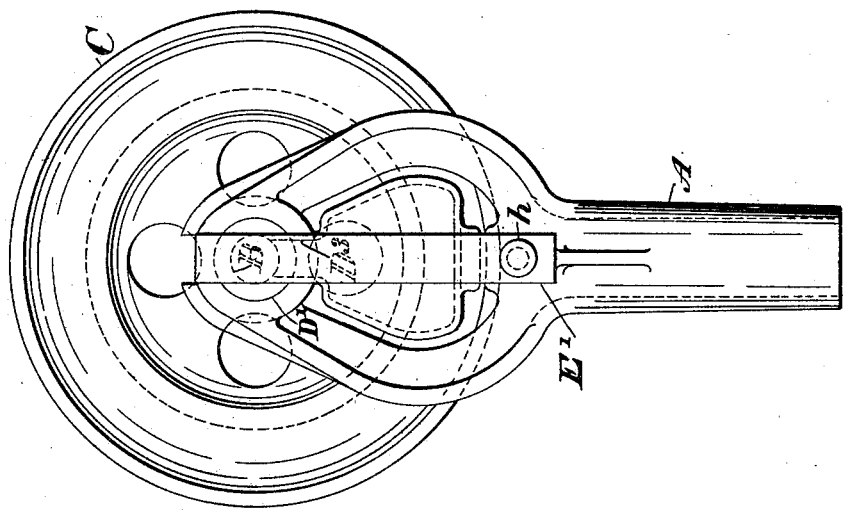
WITNESSES:
B. M. Smith.
a. M. Moses.
INVENTOR
J. D. Forrer,
BY
Geo. H. Parmelee,
his ATTORNEY.

UNITED STATES PATENT OFFICE.

JOSEPH D. FORRER, OF JOHNSTOWN, PENNSYLVANIA, ASSIGNOR TO THE LORAIN STEEL COMPANY, OF PENNSYLVANIA.

TROLLEY WHEEL AND HARP.

SPECIFICATION forming part of Letters Patent No. 668,174, dated February 19, 1901.

Application filed June 8, 1900. Serial No. 19,643. (No model.)

*To all whom it may concern:*

Be it known that I, JOSEPH D. FORRER, of Johnstown, in the county of Cambria and State of Pennsylvania, have invented a new and useful Improvement in Trolley Wheels and Harps, of which the following is a full, clear, and exact description, reference being had to the accompanying drawings, which form a part of this specification.

My invention has relation to certain new and useful improvements in trolley wheels and harps, and is designed to provide a simple and desirable construction in which the parts can be readily assembled and also removed and replaced or renewed, which provides for self-lubrication of the bearings, and in which there is insured good electrical connection at all times between the wheel and harp.

With this object in view the invention consists in the combination, with a harp provided with seats for bearing members, of a wheel-spindle and wheel connected to rotate as one piece, removable bearing members fitting the said seats and receiving the ends of the wheel-spindle, and contact-springs secured to the harp and arranged to insure efficient electrical contact between the wheel and harp at all times, all substantially as hereinafter described and claimed.

The invention also embodies the use of novelly-arranged receptacles in the parts containing material for keeping lubricated the bearings of the wheel-spindle in the said sleeves.

It further consists in the novel construction and combination of parts, all as hereinafter described, and pointed out in the appended claims, reference being had to the accompanying drawings, which form a part of this specification.

Figure 1:
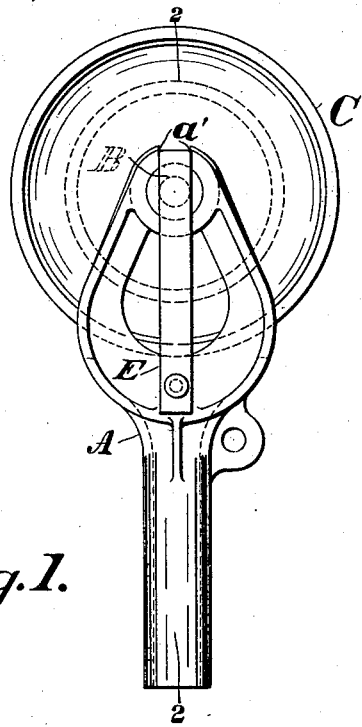
Figure 2:
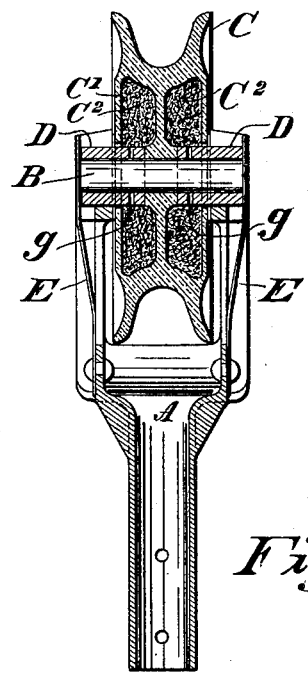
Figure 3:
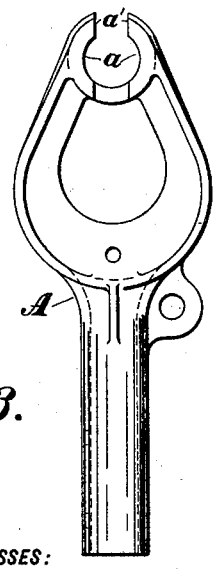
Figure 4:
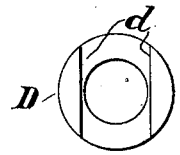

In the drawings, Figure 1 is a side elevation of a trolley wheel and harp embodying my invention. Fig. 2 is a section on the line 2 2 of Fig. 1. Fig. 3 is a side elevation of the harp; and Fig. 4 is an end view of one of the bearing-sleeves, this view being on a somewhat-larger scale than Fig. 3. Figs. 5 and 6 are respectively side and sectional elevations, showing a modified construction.

The letter A designates the harp, whose arms are provided with circular bearing-seats $a$, into which open, from the upper ends of the said arms, the vertical slots $a'$ of a width just sufficient to receive the wheel-spindle B.

C is the wheel, which is brazed or otherwise rigidly secured to the spindle and which is formed with interior chambers $C'$, designed to contain a suitable lubricant $C^2$, such as soft felt or similar material which has been saturated with oil.

D designates short cylindrical bearing members in the form of sleeves, which receive the end portions of the spindle and which are held in the bearing-seats $a$, with their inner ends extending into the axial portion of the wheel into approximate contact with the hub thereof.

E designates flat springs which are secured to the sides of the harp at or near its base, with their free end portions impinging against the ends of the spindle and making good electrical contact therewith. These springs also engage grooves $d$ in the outer ends of the sleeves D, and thereby secure the latter against rotary movement and also outward endwise displacement.

In assembling the parts the wheel and spindle are first entered into the harp, the spindle passing through the slots $a'$ into the bearing-seats $a$. The sleeves D are then slipped over the ends of the spindle into the said seats and are secured by the springs E.

The wheel can be readily removed and renewed whenever necessary by removing the sleeves D, and the latter as well as the springs E may also be readily renewed when worn.

The oil contained in the lubricating material finds its way to the spindle and bearings between the hub of the wheel and the inner ends of the sleeves D, and small radial holes $g$ may also be drilled in said sleeves, if desired to form additional lubricant-passages.

In the construction shown in Figs. 5 and 6 instead of using a hollow wheel containing lubricating material I provide the bearing-sleeves (which are here designated $D'$) with the chambered downward extensions $D^2$, connected to the sleeve proper by neck portions $D^3$ and which are shaped to fit the lateral concavities or dished faces of the wheel and also the curved-out portions of the harp-arms. The springs E' engage these sleeves in the same manner as the springs E, above described, and are also formed with the short arms $E^2$ at their lower ends, which press inwardly against the lower portions of the extensions $D^2$. By turning the springs on their securing-rivets $h$ they may be disengaged from said sleeves and extensions to permit the latter to be removed or replaced. The chambers of these extensions form receptacles for oil or other lubricating material, which may be brought into contact with the wheel-spindle by wicks or other suitable means. (Not shown.)

It is obvious that, if desired, the engagement of the springs E or E' with the bearing-sleeves D or D' may be alone depended upon to provide a good electrical connection between the wheel and harp, since said springs at all times hold the inner ends of the sleeves against the hub of the wheel.

I do not wish to limit myself to the exact construction, combination, and arrangement of parts which I have herein shown and described, as changes may be made in the details thereof without departing from the spirit and scope of my invention.

Having thus described my invention, what I claim, and desire to secure by Letters Patent, is—

1. The combination with a harp provided with seats for bearing members, of a wheel-spindle, a wheel connected thereto, to rotate therewith, removable bearing members fitting the said seats and receiving the end portions of said spindle, and spring contact devices secured to the harp and impinging the ends of the spindle.

2. The combination with a harp provided with seats for bearing members, of a wheel-spindle, a wheel connected to said spindle to rotate therewith, removable bearing members fitting the said seats and receiving the end portions of said spindle, and contact-springs secured to the harp and impinging the ends of the spindle, and also engaging the said members and securing them against rotation and displacement.

3. The combination with a trolley-harp having its arms provided with seats for bearing-sleeves and with open vertical slots entering the said seats, of a trolley wheel and spindle connected to rotate as one piece, bearing-sleeves removably held in said seats and receiving the end portions of the said spindle, and springs secured to the harp and impinging against the ends of the spindle and also engaging the ends of the sleeves to secure the same against movement.

4. The combination with a trolley-harp, having its arms provided with seats for bearing-sleeves and with open vertical slots entering the said seats, of a trolley wheel and spindle connected to rotate together, bearing-sleeves removably placed in said seats and receiving the said spindle, and contact devices secured to the exterior of the harp and engaging the ends of the spindle and also the outer ends of the sleeves.

5. In a trolley, the combination with a harp, having its arms formed with bearing-seats, of bearing-sleeves placed loosely in said seats, and springs engaging the said sleeves to prevent movement and displacement thereof, said springs also being arranged to make electrical contact with the ends of the spindle.

6. In a trolley, the combination with a harp, having its arms provided with bearing-seats, of bearing-sleeves placed loosely in said seats and having grooved outer ends, and contact devices arranged to impinge on the wheel-spindle and also engage the grooves in said sleeves.

7. In a trolley, the combination with a harp, having its arms provided with circular openings and with open vertical slots entering the said openings, of a wheel and spindle connected to rotate together, the end portions of said spindle being arranged to enter the said slots endwise-removable bearing-sleeves in said seats which receive the said spindle, and means for normally securing said sleeves against movement and displacement.

8. In a trolley, the combination with a harp, the bearing members removably seated in the arms of the harp and containing lubricant-chambers, a trolley-wheel and spindle journaled in the said members and connected to the wheel to rotate therewith.

9. In a trolley, the combination with the harp, the bearing-sleeves removably seated in the arms of the harp and having chambered extensions, a trolley-wheel, and a spindle journaled in said sleeves and connected to the wheel to rotate therewith, and contact devices secured to the harp and impinging against the ends of the spindle.

10. In a trolley, with a harp having open bearing-seats in its arms, and openings below the said seats, of the bearing members in said seats having downward extensions fitting the said openings and containing lubricant-chambers, the wheel having its rotary spindle journaled in said members, and the contact-springs engaging the ends of said sleeves.

11. The combination with the harp having open bearing-seats and openings below the said seats, the bearing members in said seats having downwardly-extending chambered portions lying in said openings, a wheel, a spindle to which the wheel is secured and which is journaled in the said members, and spring-arms pivoted to the harp and engaging said members at both their upper and lower portions.

12. In a trolley, the combination with the harp, of the bearing and lubricant-containing members removably seated therein and adapted to receive the wheel-spindle, and spring contact devices which hold said members to their seats and also form electrical connections between the spindle and harp.

13. In a trolley, the combination with a harp, of bearing members removably seated in the arms of said harp, and having downwardly-extending lubricant-chambers, and means for normally securing said members against displacement.

14. In a trolley, a harp having seats for bearing-sleeves, a wheel and spindle connected to rotate together, removable bearing-sleeves fitting the said seats and receiving the end portions of the spindle, and contact devices secured to the harp and engaging the said sleeves to make electrical connection therewith and also to hold said sleeves against outward endwise displacement.

In testimony whereof I have affixed my signature in presence of two witnesses.

JOS. D. FORRER.

Witnesses:
  B. M. SMITH,
  H. W. SMITH.